United States Patent [19]

Schwerdt

[11] Patent Number: 4,817,926
[45] Date of Patent: Apr. 4, 1989

[54] HYDRAULICALLY DAMPED TUBULAR RUBBER SPRING

[75] Inventor: Hans-Werner Schwerdt, Laudenbach, Fed. Rep. of Germany

[73] Assignee: Firma Carl Freudenberg, Weinheim an der Bergstrasse, Fed. Rep. of Germany

[21] Appl. No.: 175,758

[22] Filed: Mar. 31, 1988

[30] Foreign Application Priority Data

Apr. 4, 1987 [DE] Fed. Rep. of Germany ....... 3711424

[51] Int. Cl.⁴ .............................................. F16F 13/00
[52] U.S. Cl. ................................. 267/140.1; 267/219; 267/152; 267/141.2; 248/562
[58] Field of Search ................................ 267/219–220, 267/35, 279–282, 276, 292–294, 140.1–141.7, 152, 153; 180/312, 300, 902; 248/631, 562, 636, 659; 384/222, 276, 297, 220, 202, 234; 403/225; 123/192 R, 195 R

[56] References Cited

U.S. PATENT DOCUMENTS

| | | | |
|---|---|---|---|
| 4,588,174 | 5/1986 | Konishi | 267/279 X |
| 4,605,207 | 8/1986 | Konishi | 267/281 |
| 4,702,346 | 10/1987 | Uno et al. | 267/140.1 X |
| 4,717,111 | 1/1988 | Saito | 267/140.1 X |
| 4,728,086 | 3/1988 | Ishiyama et al. | 267/140.1 |
| 4,749,174 | 6/1988 | Kanda | 267/140.1 |

FOREIGN PATENT DOCUMENTS

| | | | |
|---|---|---|---|
| 0009120 | 4/1980 | European Pat. Off. | |
| 3343392 | 9/1984 | Fed. Rep. of Germany | |
| 0006444 | 1/1984 | Japan | 267/279 |
| 0172743 | 9/1985 | Japan | 267/140.1 |
| 0010138 | 1/1986 | Japan | 267/140.1 |
| 0009039 | 1/1987 | Japan | 248/562 |

Primary Examiner—Douglas C. Butler
Attorney, Agent, or Firm—Felfe & Lynch

[57] ABSTRACT

A hydraulically damped tubular rubber spring comprising spaced apart inner and outer tubes, made of aluminum, sheet metal or plastic. Disposed in the spacing between the tubes is a rubber element which is adhesively mounted both internally and externally and which comprises at least two chambers, arranged in a row in the direction in which the forces are applied, and separated by a partition. These chambers are filled with a liquid and interconnected through at least one throttle opening. The inner tube is provided at least at one point with a radial enlargement of its wall, and the throttle opening is enclosed over at least a portion of its length by the radial enlargement.

10 Claims, 2 Drawing Sheets

HYDRAULICALLY DAMPED TUBULAR RUBBER SPRING

BACKGROUND OF THE INVENTION

The invention relates to a hydraulically damped tubular rubber spring consisting of an inner tube and an outer tube, both made of hard materials, the outer tube surrounding the inner tube in a spaced relationship. In the clearance resulting from such spacing there is disposed a rubber element that is adhesively mounted both internally and externally and which comprises at least two chambers, arranged in a row in the direction in which the forces are applied, and separated by a partition. These chambers are filled with a liquid and are interconnected through at least one throttle opening, the mouths of which are spaced sufficiently on either side from fronting surfaces so that there is no measurable back-up therein of liquid streams that issue as a result of vibrations.

A tubular rubber spring of this type is known from the European Pat. No. 9,120. In this device the throttle opening is formed by a very narrow duct pressed into the outer circumference of an intermediate tube disposed between the rubber element and the outer tube. The damping properties of this known tubular rubber spring are not fully satisfactory.

Another design of a tubular rubber spring is disclosed in the German published patent application No. 33 43 392. In this case, the throttle opening is disposed in a radial enlargement of the wall of the inner tube and comprises two mouths which are centrally associated with the axis of symmetry, are open in the direction in which the forces act, and are directly in front of the abutment surfaces of the outer tube. With this design, the damping action is far from satisfactory especially in the case of pronounced displacements of the inner tube relative to the outer tube.

SUMMARY OF THE INVENTION

A principal object of the invention is to improve a tubular rubber spring of the type described above so that improved damping action is obtained and, more particularly, so that the damping action can be better adapted to specific requirements of a given application.

In accordance with the invention, this object, as well as other objects which will become apparent from the discussion that follows, are achieved by providing the inner tube with at least one radial enlargement of its wall that extends at right angles to the direction in which the forces are applied, and by enclosing the throttle opening over at least a portion of its length by the radial enlargement. This makes possible a much better design of the throttle opening.

In the inventive design, the throttle opening of the tubular rubber spring conforms to the motions of the vibrations introduced into the inner tube, and its mouths are disposed so that an undisturbed inflow and outflow of the liquid contained in the chambers is assured regardless of the operating situation in a given case and of the position relative to the outer tube. The direction in which the throttle opening extends substantially conforms to the direction of the introduced vibrations, and even the inertia of the liquid contained in the throttle opening can thus produce a relative displacement of portions of the liquid. The maximum values obtained in the case of extreme motions consequently exceed the maximum velocities in comparable designs where the throttle openings are static or open in close proximity to clear spaces. Furthermore, the aforesaid effect is also greatly promoted by the fact that the throttle openings preferably have the same profile and the same cross-sectional area over their entire lengths.

As a result, no differential velocity gradients can develop in the liquid flowing through dissimilar stretches of their path, which is highly conducive to good damping action. A throttle opening of circular cross-section is generally preferred. A tubular rubber spring with these features can be adapted very precisely with respect to its damping characteristics and its service life to the requirements of a given application.

The enlargement may be formed by a rib which extends parallel to the tubular rubber spring and is embedded in the partition. Depending on the design, this will result in a further stiffening of the partition, which also has spring action, and this is desirable, for example, in order to reduce the resilience of the tubular rubber spring in the direction of the rib. Moreover, it results in a reduction of the bulging elasticity of the partition, which in the case of relative displacements of the inner tube produces a more pronounced forcing of portions of the liquid through the throttle opening, and hence increased damping action. The ratio between the radial length of the rib and the radial length of the partition may then range from 0.1 to 0.8, and preferably from 0.3 to 0.65. The rib may be centrally embedded in the partition and may be bounded in the direction of the introduced vibrations by surfaces inclined in a mirror-image relationship and intersecting along an edge extending parallel to the tubular rubber spring. It tapers at right angles to the direction of motion in the direction away from the inner tube. As a result, the partition has a relatively reduced absolute length midway along its thickness between the inner and outer tubes, based on the area of its surfaces bounding the two chambers.

Upon the occurrence of a relative displacement of the inner tube due to vibrations, the specific elasticity is reduced in the last-mentioned area, which results in a marked reduction of the boundary stresses there present, as well as in an extension of the service life. It is advisable that the wedge surfaces make an angle with each other of from 60 to 120 degrees, and preferably from 80 to 100 degrees. They intersect and bound each other along an edge which advantageously is slightly rounded in order to prevent the occurrence of critical peak stresses also at this point. The throttle opening may be in the form of a channel, in which case it should have a length-to-diameter ratio of between 2 and 50, and preferably between 5 and 30. This permits excellent damping action to be obtained, especially in the region of low-frequency vibrations. When the channel has a cross section other than circular, the diameter is determined on the basis of an imaginary circular area of the same size. The damping action is increased further when there is at least one sudden change in direction over the length of the channel forming the throttle opening. This will be the case, for example, when the throttle opening is formed by two bores which pass into each other and whose axes intersect at an angle of from 80 to 170 degrees, and preferably from 120 to 150 degrees.

The channel-like throttle openings of the type described above may be provided at one end at least with a constantly widening flare for the purpose of preventing turbulence within the volume of liquid entering and exiting in this region in operation. This precludes cavitation. Optimal results are obtained when the ends of the throttle opening are given the shape of a venturi tube.

Moreover, the throttle opening may comprise at least two partial openings which interconnect the chambers independently of each other and which may optionally have different cross sections and/or different lengths. The overall damping action obtained can then be coordinated very precisely with the specific frequency ranges of the introduced vibrations in which there is a preferential need for good damping action by reason of the particular application.

The various features of novelty which characterize the invention are pointed out with particularity in the claims annexed to and forming a part of this specification. For a better understanding of the invention, its operating advantages and specific objects obtained by its use, reference should be made to the accompanying drawings and the following descriptive matter in which there are illustrated and described the preferred embodiments of the invention.

DESCRIPTION OF THE PREFERRED EMBODIMENTS

Figure 1:
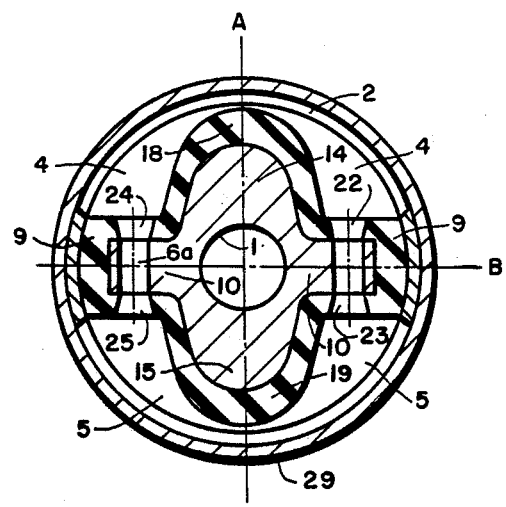
FIG. 1 is a cross sectional view through a hydraulically damped tubular rubber spring in accordance with the invention.
Figure 2:
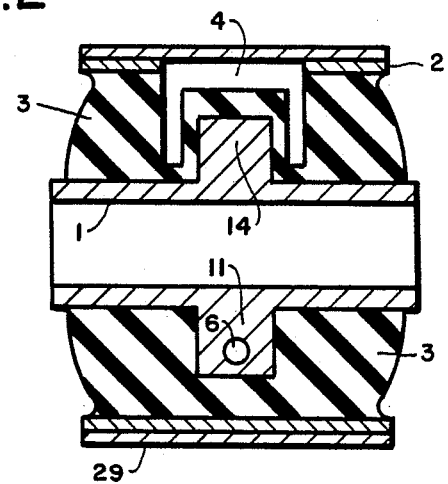
FIG. 2 is a longitudinal sectional view through the tubular rubber spring of FIG. 1, taken along the line of intersection A-B.

As is apparent from FIGS. 1 and 2, the hydraulically damped tubular rubber spring consists of an inner tube 1 and an outer tube 2 between which there is vulcanized a rubber element 3.

Disposed axially in the center of the tube 2 are chambers 4 and 5 which are separated by elastic partitions 9 that form part of the rubber element 3. Enlargements 10 of the inner tube 1 that are integral with the latter extend radially into the partitions 9.

Within the partitions 9 and the radial enlargements 10 there are throttle openings 6 and 6a, which form overflow channels. The two overflow channels 6 and 6a may have different diameters but the same length. In the case of a radial deflection of the inner tube 1 relative to the outer tube 2, the liquid is able to flow through the channels 6 and 6a back and forth between the chambers 4 and 5, respectively, by the shortest route and with precisely predetermined flow resistance.

The shape and size of the radial enlargements 10 as well as of the partitions 9 and of the overflow channels 6 and 6a may be varied on the basis of the magnitude of the forces applied to the inner tube and of the desired damping.

Figure 3:
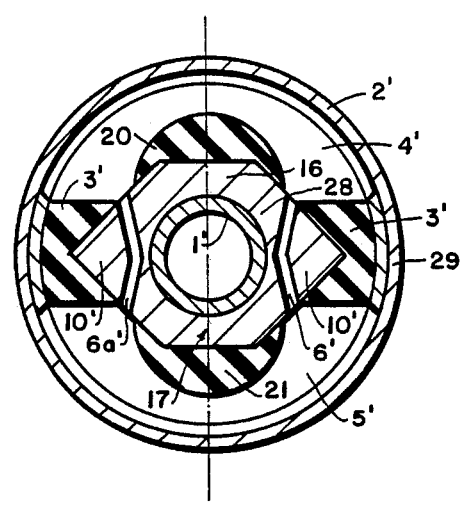
FIG. 3 is a cross sectional view through another embodiment of a tubular rubber spring in accordance with the invention.

FIG. 3 illustrates another embodiment with different radial enlargements 10' and different throttle openings 6' and 6a' having a higher flow resistance.

The flow can be further influenced by giving the mouths of the throttle openings 6 and 6a or 6' and 6a' a conical shape or the shape of a venturi tube. Such conical shapes are shown in FIG. 1 as parts 22 and 23 of opening 6 and 24 and 25 of opening 6a.

Further enlargements 14 and 15 (FIG. 1) or 16 and 17 (FIG. 3) of the inner tube 1 project into the upper and lower chambers 4 and 5 or 4' and 5', respectively, of the tubular rubber spring and together with elastomeric overlays 18 and 19 or 20 and 21, respectively, differing in thickness form the abutments.

The onset and progress of the abutting action in the presence of large amplitudes can be established by means of differing shapes, widths and heights of the elastomeric overlays 18, 19, 20 and 21.

The limitation of the radial deflection is established through the height of the enlargements 14, 15, 16 and 17 of the inner tube 1 and 1', which, as is apparent from FIG. 1, may be integral therewith.

In another design of the enlargement 16 and 17, a separate element 28 is made of a rigid material, as shown in FIG. 3. The element 28 may consist of metal or, optionally, of a rigid plastic. This element has a central bore in which the inner tube 1' is inserted with a tight fit. Similarly, the outer tube 1 and 1' may be surrounded by a reinforcing and protecting element 29.

Figure 4:
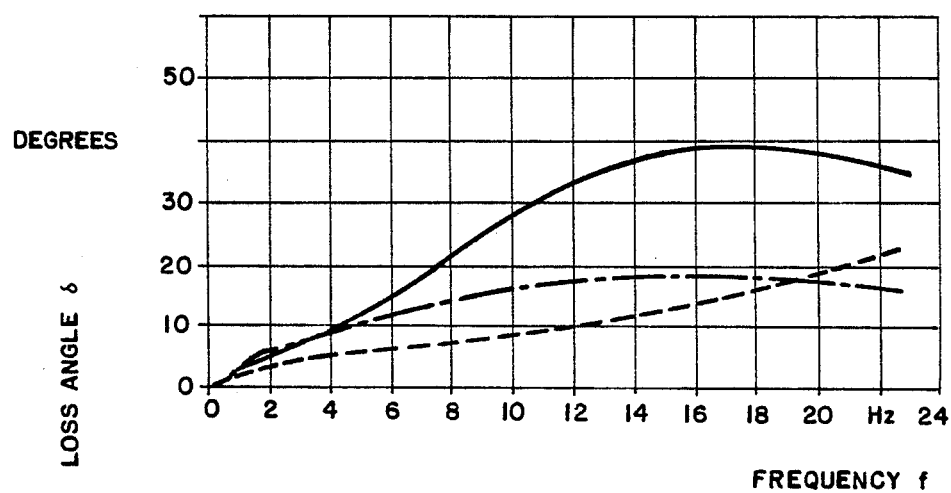
FIG. 4 is a graph of the damping action of an exemplary embodiment of a tubular rubber spring according to the invention.

Shown in FIG. 4 is a graph in which the loss angle $\delta$ of an exemplary embodiment of the inventive tubular rubber spring is plotted by means of a solid line against the associated frequency. In a type of construction patterned on FIGS. 1 and 2 which had a maximum diameter of 60 mm and an axial length of 55 mm, the loss angle $\delta$ was 39 degrees. There was only one throttle opening between the chambers 4 and 5 which was directly adjacent to the connecting opening of the tube 1 and extended parallel to the direction of the introduced vibrations. The throttle opening had the form of a channel, a length of approximately 10 mm, and a diameter of 3 mm.

For comparison, another comparable construction was then tested in which the throttle opening extended parallel to the direction of the introduced vibrations centrally through the inner tube 1 and terminated in proximity to the abutments on both sides.

The loss angle $\delta$ measured is plotted as a dashed line in the graph. It is significantly less than that of the inventive design.

The test described above was then repeated using the described tubular rubber spring, in which the chambers 4 and 5 were in this case interconnected through a tube that had been wrapped externally around the spring and had an inside diameter of 3 mm. The loss angle $\delta$ so obtained is shown in the graph of FIG. 4 as a dash-dotted line. It is also clearly less than that of the inventive design.

It will be understood that the specification and examples are illustrative but not limitative of the present invention and that other embodiments within the spirit and scope of the invention will suggest themselves to those skilled in the art.

What is claimed is:

1. In a hydraulically damped tubular rubber spring comprising, in combination:
    (a) an inner tube made of a hard, rigid material;
    (b) an outer tube made of a hard, rigid material, said outer tube surrounding said inner tube in a spaced relationship;
    (c) an elastomeric element disposed in the spacing between said inner and said outer tubes and adhesively attached thereto, said elastomeric element defining at least two chambers separated by a partition and arranged in succession in the direction in which forces are to be applied to said rubber spring;

(d) at least one throttle opening interconnecting said two chambers for passage of a liquid contained in said chambers;

the improvement wherein the inner tube is provided at least at one point with a radial enlargement of its wall that extends at right angles to the direction in which the forces are introduced, wherein the throttle opening is completely enclosed over at least a portion of its axial length by the radial enlargement, wherein the enlargement is formed by a rib which extends parallel to the axis of said inner tube, said rib being embedded in said partition, and wherein the ration between the radial length of the enlargement and the radial length of the partition is in the range of 0.3 to 0.65.

2. The tubular rubber spring according to claim 1, wherein said rib is centrally embedded in the partition and bounded in the direction of the introduced vibrations by surfaces inclined in a mirror-image relationship which intersect along an edge extending parallel to said axis.

3. The tubular rubber spring according to claim 1, wherein the throttle opening is in the form of a channel, and wherein its length-to-diameter ratio is between 2 and 50.

4. The tubular rubber spring according to claim 3, wherein said length-to-diameter ratio is between 5 and 30.

5. The tubular rubber spring according to claim 3, wherein there is at least one abrupt change in direction over the length of the throttle opening.

6. The tubular rubber spring according to claim 1, wherein the throttle opening is provided at one end at least with a constantly widening flare.

7. The tubular rubber spring according to claim 6, wherein said flare has the shape of a venturi tube.

8. The tubular rubber spring according to claim 1, wherein the throttle opening comprises at least two separate openings which interconnect the chambers independently of each other.

9. The tubular rubber spring according to claim 8, wherein said separate openings have different cross sections.

10. The tubular rubber spring according to claim 8, wherein said separate openings have different lengths.

* * * * *